United States Patent
Xiang et al.

(10) Patent No.: US 12,386,007 B2
(45) Date of Patent: Aug. 12, 2025

(54) SOUND SOURCE ENUMERATION AND DIRECTION OF ARRIVAL ESTIMATION USING A BAYESIAN FRAMEWORK

(71) Applicant: RENSSELAER POLYTECHNIC INSTITUTE, Troy, NY (US)

(72) Inventors: Ning Xiang, Cohoes, NY (US); Dane Bush, Mountain View, CA (US); Christopher Landschoot, Chicago, IL (US)

(73) Assignee: Rensselaer Polytechnic Institute, Troy, NY (US)

( * ) Notice: Subject to any disclaimer, the term of this patent is extended or adjusted under 35 U.S.C. 154(b) by 409 days.

(21) Appl. No.: 17/622,298

(22) PCT Filed: Jun. 29, 2020

(86) PCT No.: PCT/US2020/040046
§ 371 (c)(1),
(2) Date: Dec. 23, 2021

(87) PCT Pub. No.: WO2020/264466
PCT Pub. Date: Dec. 30, 2020

(65) Prior Publication Data
US 2022/0260665 A1    Aug. 18, 2022

Related U.S. Application Data

(60) Provisional application No. 63/041,429, filed on Jun. 19, 2020, provisional application No. 62/889,766, (Continued)

(51) Int. Cl.
*G01S 3/80*    (2006.01)
*G01S 3/803*   (2006.01)
*H04R 1/08*    (2006.01)

(52) U.S. Cl.
CPC .......... *G01S 3/8006* (2013.01); *G01S 3/8036* (2013.01); *H04R 1/08* (2013.01)

(58) Field of Classification Search
None
See application file for complete search history.

(56) References Cited

U.S. PATENT DOCUMENTS

| | | |
|---|---|---|
| 4,402,779 A | 9/1983 | Levy |
| 7,039,198 B2 | 5/2006 | Birchfield et al. |
| (Continued) | | |

OTHER PUBLICATIONS

International Search Report and The Written Opinion of the International Searching Authority, International Application No. PCT/US2020/040046, mailed Oct. 1, 2020.
(Continued)

*Primary Examiner* — Paul W Huber
(74) *Attorney, Agent, or Firm* — Barclay Damon LLP; Anthony P. Gangemi

(57) ABSTRACT

One embodiment provides a method of sound source enumeration and direction of arrival (DoA) estimation. The method, the method includes estimating, by an enumeration module, a number of sound sources associated with an acoustic signal. The estimating includes selecting a specific parametric model from a generalized model. The generalized model is related to a microphone array architecture used to capture the acoustic signal. The method further includes estimating, by a DoA module, a direction of arrival of each sound source of the number of sound sources based, at least in part, on the selected model. The estimating the number of sound sources and estimating the DoA of each sound source are performed using a Bayesian framework.

20 Claims, 2 Drawing Sheets

Related U.S. Application Data filed on Aug. 21, 2019, provisional application No. 62/867,444, filed on Jun. 27, 2019.

(56) References Cited

U.S. PATENT DOCUMENTS

| | | |
|---|---|---|
| 7,394,907 B2 | 7/2008 | Tashev |
| 8,077,088 B2 | 12/2011 | Rose |
| 8,743,658 B2 * | 6/2014 | Claussen ............... G01S 3/8006 367/118 |
| 8,880,395 B2 | 11/2014 | Yoo et al. |
| 8,948,428 B2 | 2/2015 | Kates |
| 9,357,293 B2 | 5/2016 | Claussen |
| 9,443,529 B2 | 9/2016 | Eddington, Jr. |
| 9,495,591 B2 | 11/2016 | Visser et al. |
| 10,192,568 B2 * | 1/2019 | Wang ..................... G10L 25/21 |
| 10,204,638 B2 | 2/2019 | Eddington, Jr. |
| 2006/0245601 A1 | 11/2006 | Michaud et al. |
| 2008/0247565 A1 | 10/2008 | Elko et al. |
| 2018/0075860 A1 * | 3/2018 | Parada .................... G10L 25/03 |
| 2018/0109873 A1 | 4/2018 | Xiang et al. |
| 2019/0116449 A1 | 4/2019 | Norris et al. |
| 2019/0208317 A1 | 7/2019 | Woodruff et al. |

OTHER PUBLICATIONS

Bush, D., et al., "A model-based Bayesian framework for sound source enumeration and direction of arrival estimation using a coprime microphone array," The Journal of the Acoustical Society of America, vol. 143, pp. 1-47, Jun. 29, 2018.

* cited by examiner

SOUND SOURCE ENUMERATION AND DIRECTION OF ARRIVAL ESTIMATION USING A BAYESIAN FRAMEWORK

CROSS REFERENCE TO RELATED APPLICATION(S)

This application claims the benefit of U.S. Provisional Application No. 62/867,444, filed Jun. 27, 2019, U.S. Provisional Application No. 62/889,766, filed Aug. 21, 2019, and U.S. Provisional Application No. 63/041,429, filed Jun. 19, 2020, which are incorporated by reference as if disclosed herein in their entireties.

FIELD

The present disclosure relates to sound source enumeration and direction of arrival estimation, in particular to, sound source enumeration and direction of arrival estimation using a Bayesian framework.

BACKGROUND

Microphone arrays may be used in a variety of acoustic applications, including, but not limited to, passive-sonar localization, spatial-audio recording, and isolation of a particular signal from noise. For example, acoustic source localization based on microphone array signal processing may be used to aid in locating a source of gunfire. In another example, acoustic source localization may be used to localize an unknown number of spatially distributed sound sources in spatially distributed noise.

Localizing multiple concurrent sound sources simultaneously in complex sound environments can be a challenge as there may be variations in the number of sources, along with their locations, characteristics, and strengths. There may also be unwanted interference from fluctuating background noise.

SUMMARY

In an embodiment, there is provided a method of sound source enumeration and direction of arrival (DoA) estimation. The method, the method includes estimating, by an enumeration module, a number of sound sources associated with an acoustic signal. The estimating includes selecting a specific parametric model from a generalized model. The generalized model is related to a microphone array architecture used to capture the acoustic signal. The method further includes estimating, by a DoA module, a direction of arrival of each sound source of the number of sound sources based, at least in part, on the selected model. The estimating the number of sound sources and estimating the DoA of each sound source are performed using a Bayesian framework.

In some embodiments, the method may further include capturing, by the microphone array, the acoustic signal, the microphone array configured to implement beamforming.

In some embodiments of the method, the estimating the DoA includes estimating at least one parameter of the selected model.

In some embodiments of the method, the estimating the number of sound sources includes comparing an evidence associated with a first parametric model with an evidence associated with a second parametric model.

In some embodiments of the method, the microphone array architecture corresponds to a coprime microphone array.

In some embodiments of the method, the microphone array architecture corresponds to a spherical microphone array.

In some embodiments of the method, the estimating the number of sound sources includes nested sampling.

In some embodiments, there is provided a computer readable storage device. The device has stored thereon instructions that when executed by one or more processors result in the following operations including: estimating a number of sound sources associated with an acoustic signal. The estimating includes selecting a specific parametric model from a generalized model. The generalized model is related to a microphone array architecture used to capture the acoustic signal. The operations further include estimating a direction of arrival of each sound source of the number of sound sources based, at least in part, on the selected model. The estimating the number of sound sources and estimating the DoA of each sound source are performed using a Bayesian framework.

In some embodiments, the instructions that when executed by one or more processors result in the following additional operations including capturing the acoustic signal, the microphone array configured to implement beamforming.

In some embodiments of the computer readable storage device, estimating the DoA includes estimating at least one parameter of the selected model.

In some embodiments of the computer readable storage device, estimating the number of sound sources includes comparing an evidence associated with a first parametric model with an evidence associated with a second parametric model.

In some embodiments of the computer readable storage device, the microphone array architecture corresponds to a coprime microphone array.

In some embodiments of the computer readable storage device, the microphone array architecture corresponds to a spherical microphone array.

In some embodiments of the computer readable storage device, estimating the number of sound sources includes nested sampling.

In an embodiment, there is provided system for sound source enumeration and direction of arrival (DoA) estimation. The system includes a computing device. The computing device includes an enumeration module and a DoA module. The enumeration module is configured to estimate a number of sound sources associated with an acoustic signal. The estimating includes selecting a specific parametric model from a generalized model. The generalized model is related to a microphone array architecture used to capture the acoustic signal. The DoA module is configured to estimate a direction of arrival of each sound source of the number of sound sources based, at least in part, on the selected model. The estimating the number of sound sources and estimating the DoA of each sound source are performed using a Bayesian framework.

In some embodiments, the system further includes a microphone array configured to capture the acoustic signal. The microphone array is configured to implement beamforming.

In some embodiments of the system, estimating the DoA includes estimating at least one parameter of the selected model.

In some embodiments of the system, estimating the number of sound sources comprises comparing an evidence associated with a first parametric model with an evidence associated with a second parametric model.

In some embodiments of the system, the microphone array architecture corresponds to a coprime microphone array.

In some embodiments of the system, the microphone array architecture corresponds to a spherical microphone array.

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

DETAILED DESCRIPTION

Figure 1:
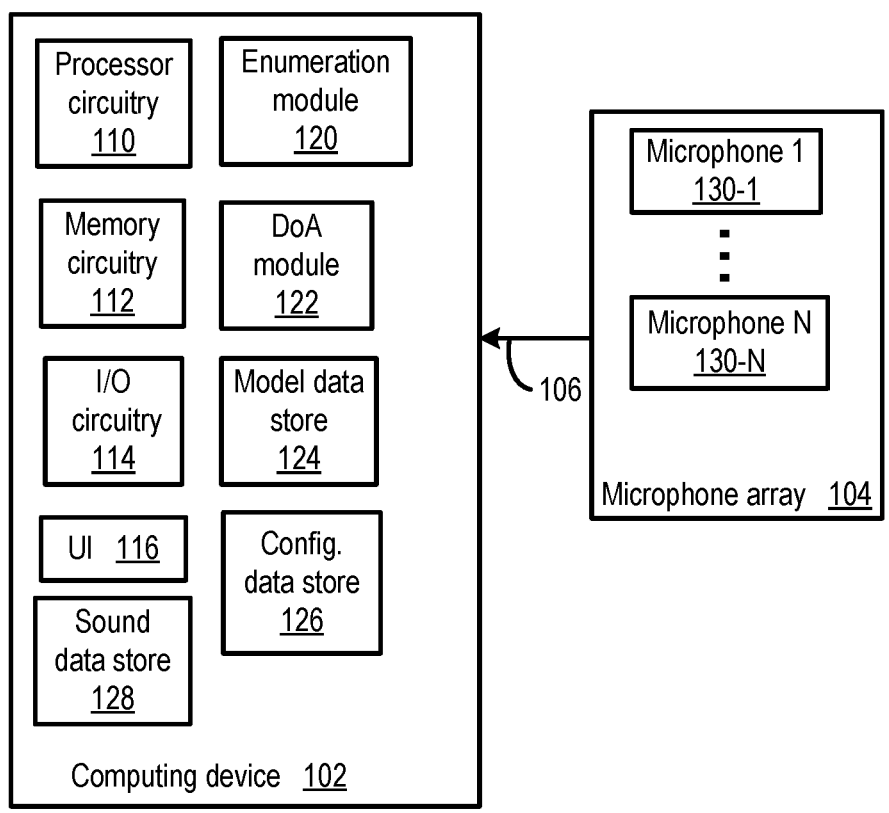
FIG. 1 illustrates a functional block diagram of a sound source enumeration and direction of arrival estimation system consistent with several embodiments of the present disclosure.

In many room acoustics and noise control applications, it may be challenging to identify the directions of arrivals (DoAs) of each of a possible plurality of incoming sound sources. When estimating the DoA, the acoustic signal under consideration may contain one or a plurality of concurrent sound sources originating from one or more directions. This leads to a two-tiered challenge of first identifying the correct number of sources, followed by determining the directional information of each source.

Generally, this disclosure relates to sound source enumeration and direction of arrival estimation using a Bayesian framework. The acoustic signal may be captured by an array of microphones arranged in a defined microphone array architecture. Microphone array architectures may include, but are not limited to, linear arrays, coprime linear microphone arrays, spherical microphone arrays (e.g., full spherical and hemispherical), etc. The captured acoustic signal may then be converted to one or more representative electrical signals.

A model-based Bayesian framework, consistent with the present disclosure, is configured to utilize Bayes' Theorem both to estimate a number of sound sources and to estimate a direction of arrival (DoA) for each sound source associated with the captured acoustic signal. DoA may include one or more of an elevation and/or azimuth incident angle of a sound source relative to the microphone array.

Estimating the number of sound sources includes selecting a specific parametric model from a generalized model based, at least in part, on probability distributions. The generalized model includes the number of sound sources as a variable while the specific parametric model has the number of sound sources fixed at the estimated number of sound sources. The specific parametric model may then be used to estimate the DoA of the sound sources. A model-based parameter estimation technique may be considered an inverse technique. The inversion to be performed is to estimate a set of parameters encapsulated in a model, based on experimental data and the model itself (the hypothesis).

Bayes' Theorem for data analysis may be written as:

$$p(\theta | \mathcal{D}, I) = \frac{p(\mathcal{D} | \theta, I) p(\theta | I)}{p(\mathcal{D} | I)} \quad (1)$$

where $\theta$ corresponds to model parameters $(\theta_1, \theta_2, \ldots \theta_j)$ for a parametric function (i.e., model), $H(\theta)$; $\mathcal{D}$ is experimental data (e.g., $d_1, d_2, \ldots, d_k$); and (represents background information. In Bayesian analysis, a goal is to estimate the parameters, $\theta$, contained in the model, $H(\theta)$, from the experimental observations, $\mathcal{D}$. $p(\theta|I)$ is a probability representing the initial implication of the parameter values from the background information before taking into account the experimental data $\mathcal{D}$, and is referred to as the prior probability for $\theta$ ("prior" for short). $p(\mathcal{D}|\theta,I)$, called "likelihood", represents the probability of observing the data $\mathcal{D}$, if the parameters take any particular set of values $\theta$. This likelihood represents the probability of getting the measured data $\mathcal{D}$ supposing that the model $H(\theta)$ holds with values of its defining parameters $\theta$. $p(\theta|\mathcal{D},I)$ represents the probability of the parameter values $\theta$ after taking the data values $\mathcal{D}$ into account. $p(\theta|\mathcal{D},I)$ may be referred to as the "posterior" probability. The quantity $p(\mathcal{D}|I)$ in the denominator on the right-hand side of Eq. 1 represents the probability that the observed data occur no matter what the values of the parameters. $p(\mathcal{D}|I)$ may be interpreted as a normalization factor ensuring that the posterior probability for the parameters integrates to unity. Data analysis tasks based on experimental observations generally include estimating a set of parameters encapsulated in the model $H(\theta)$. The model may also be termed "the hypothesis". Thus, Bayes' theorem represents how an initial assignment may be updated based, at least in part, on data.

The posterior probability $p(\theta|\mathcal{D},I))$ may then be determined based, at least in part, on the prior probability $(p(\theta|I))$ and based, at least in part, on the likelihood function $(p(\mathcal{D}|\theta,I))$. The prior probability may represent an initial indication of possible values of parameters, $\theta$. The parameters may correspond to coefficients in a functional form that specifies the model, H. The likelihood function is configured to capture experimental data.

The prior probability may be selected based on prior information, if known, or may be selected to represent no preference for any particular value. For example, no preference may be represented by a relatively broad and/or relatively flat prior probability. In another example, a maximum entropy technique may be used to generate a maximum entropy prior. The maximum entropy technique is configured to provide a prior with no preference for a particular value while satisfying known constraints of a probability distribution. For example, a uniform prior may correspond to a location parameter. In another example, a logarithmic prior may correspond to a scale parameter.

The likelihood function represents the probability of getting the measured data assuming values of the parameters. The likelihood function may be configured to incorporate a priori information that the model $H(\theta)$ describes the experimental data D such that residual errors between the model and the data have a finite error variance $\sigma^2$. A resulting Gaussian likelihood distribution may then be a consequence of the principle of maximum entropy.

Generally, there may be a finite number of models (i.e., hypotheses), $H_1, H_2, \ldots, H_M$ that may explain captured data. Each model, $H_S$, may include a corresponding set of parameters $\theta_S$. Model selection may then correspond to an inverse problem to infer which model of the set of models may be preferred by the data. Bayesian analysis applied to parameter estimation may be understood as a first level of inference. Model selection may then be understood as a second level of inference.

Bayesian data analysis may be utilized to perform both parameter estimation and model selection, using Bayes' theorem. Bayesian data analysis, consistent with the present disclosure, may be configured to first perform the second level of inference (model selection), followed by the first level of inference (parameter estimation).

Considering model selection, given a set of competing models, Bayes' theorem may be applied to an arbitrary member, $H_S$, of the finite set of models $H_1, H_2, \ldots, H_M$, given the data D. In this context, the background information I indicates that each model of this finite model set, $H_M$ describes the data $\mathcal{D}$ well. Bayes' theorem applied to each model, $H_S$, in this set of M competing models, given the data $\mathcal{D}$ and the background information I, can be written by replacing θ in Eq. 1 by $H_S$ as:

$$p(H_S \mid \mathcal{D}, I) = \frac{p(\mathcal{D} \mid H_S, I) p(H_s \mid I)}{p(\mathcal{D} \mid I)} \quad (2)$$

In the form of Eq. 2, Bayes' theorem represents how prior knowledge about model $H_S$, encoded in the prior probability $p(H_S|I)$, is updated in the presence of data $\mathcal{D}$, given the background information I. The probability $p(\mathcal{D}|H_S,I)$ in the context of model selection is referred to as "marginal likelihood" of the data and/or the "Bayesian evidence". $P(H_S|\mathcal{D},I)$ is the posterior probability of the model $H_S$, given the data.

Model selection may include evaluating a "Bayes' factor", $K_{i,j}$ as:

$$K_{i,j} = \frac{p(H_i \mid \mathcal{D}, I)}{p(H_j \mid \mathcal{D}, I)} = \frac{p(\mathcal{D} \mid H_i, I)}{p(\mathcal{D} \mid H_j, I)} \frac{p(H_i \mid I)}{p(H_j \mid I)} \quad (3)$$

where $1 \geq i, j \geq M; i \neq j$. The fraction $$\frac{p(H_i \mid I)}{p(H_j \mid I)},$$

termed the "prior ratio", represents prior knowledge as to how strongly the model $H_i$ is preferred over $H_j$, before considering the data $\mathcal{D}$. In some situations, prior preference information regarding the models may not be available. In these situations, the principle of maximum entropy may be used to assign an equal prior probability to each of the M models as:

$$p(H_j \mid I) = \frac{1}{M}, 1 \leq j \leq M \quad (4)$$

In these situations, the Bayes' factor for model comparison between two different models $H_i$ and $H_j$ relies on the posterior ratio between the models as:

$$K_{i,j} = \frac{p(\mathcal{D} \mid H_i, I)}{p(\mathcal{D} \mid H_j, I)}, 1 \leq i, j \leq M; i \neq j \quad (5)$$

which is equal to the marginal likelihood ratio when the model probabilities are uniform.

For computational convenience, the Bayes' factor may be determined using a logarithmic scale with units 'decibans' as:

$$L_{ij} = 10 \log_{10}(B_{ij}) = 10 \log_{10}(Z_i) - 10 \log_{10}(Z_j), \text{[decibans]} \quad (6)$$

with simplified notations for the Bayesian evidence, $Z_i = p(\mathcal{D}|H_i,I)$, and $Z_j = p(\mathcal{D}|H_j,I)$. Thus, the evidence values (i.e., marginal likelihoods) for two models may be compared quantitatively. Among a finite set of competing models, a highest possible Bayes' factor, $L_{ij}$, may then indicate that the data prefers model $H_i$ over model $H_j$ the most. The model most preferred by the data may then correspond to the selected model.

Once a model has been selected, based on experimental data, the Bayesian framework may be used with the selected model ("$H_S$") to estimate the selected model parameters $\theta_S$, also based on experimental data. Bayes theorem may thus be applied to estimate the parameters, $\theta_S$, given the data $\mathcal{D}$ and the model $H_S$. The quantity $p(\mathcal{D}|I)$ in Eq. 1 becomes $p(\mathcal{D}|H_S)$, the probability of the data $\mathcal{D}$ given the model $H_S$. In this context, the background information, I, now includes that a specific model $H_S$ is selected or given. Bayes' theorem for parameter estimation operations may then be written as:

$$p(\theta \mid \mathcal{D}, H) = \frac{p(\mathcal{D} \mid \theta, H) p(\theta \mid H)}{p(\mathcal{D} \mid H)} \quad (7)$$

where the subscript S and background information, I, have been dropped for simplicity. Thus, Bayes' theorem in this context represents how prior knowledge about parameters θ, given the specific model H encoded in $p(\theta|H)$, may be updated by incorporating data $\mathcal{D}$ through the likelihood, $p(\mathcal{D}|\theta,H)$.

The prior, $p(\theta|H)$, is configured to encode the knowledge about the parameters before the data are incorporated. Once the data have been observed and/or measured, the likelihood, $p(\mathcal{D}|\theta,H)$, incorporates the data for updating the prior probability for the parameters. The posterior probability, $p(\theta|\mathcal{D},H)$, is configured to encode the updated knowledge in the light of the data.

The posterior probability is normalized and is constrained to integrate to unity over the parameter space. The normalization constraint includes integrating both sides of Eq. 7 over the parameter space, θ, where the integral marginalizes out θ which appear in the likelihood, by assigning the prior for the parameters θ. For parameter estimation, $p(\mathcal{D}|H)$ plays the role of a normalization constant in Eq. 7. $p(\mathcal{D}|H)$ is identical to the Bayesian evidence in Eq. 2. Rearrangement of the terms of Bayes theorem in Eq. 7 yields:

$$p(\theta|\mathcal{D},H) \times p(\mathcal{D}|H) = p(\mathcal{D}|\theta,H) \times p(\theta|H) \quad (8)$$

In other words, Eq. 8 may be understood as: posterior× evidence=likelihood×prior. The likelihood and the prior correspond to inputs and the posterior and evidence are outputs of the Bayesian inference.

To estimate the evidence $p(\mathcal{D}|H)$, the product of the likelihood and the prior probability are integrated over the parameter space, θ, as:

$$p(D|H) = \int p(D|\theta,H) p(\theta|H) d\theta \quad (9)$$

Estimation of the evidence may be performed using a numerical sampling technique such as a Markov chain Monte Carlo approach, e.g., nested sampling. Once the evidence has been estimated, the product of the likelihood function and the prior probability may contribute to the normalized posterior probability. From estimates of the posterior probability distributions, mean values of selected parameters, associated variances and interrelationships may be estimated.

It may be appreciated that Eq. 8 implicitly indicates that model selection and parameter estimation may both be accomplished within a unified Bayesian framework. Once the evidence has been estimated, the product of the associated likelihood function and the prior probability may contribute to the normalized posterior probability since the evidence is estimated. Mean values of relevant parameters (and also their uncertainties as indicated by associated individual variances) may be estimated from estimates of posterior distributions.

Thus, two levels of inference may be utilized in the Bayesian framework to select a model from a plurality of models and to then estimate parameters associated with the selected model. Estimating a number of sound sources based, at least in part, on an acoustic signal received by a plurality of microphones in a microphone array corresponds to model selection. Estimating a direction of arrival (e.g., angle) for each sound source corresponds to parameter estimation.

An apparatus, method and/or system for sound source enumeration and DoA estimation are configured to estimate a number of sound sources associated with an acoustic signal. The estimating may include selecting a specific parametric model from a generalized model. The generalized model is related to a microphone array architecture used to capture the acoustic signal. The apparatus, method and/or system for sound source enumeration and DoA estimation are further configured to estimate a direction of arrival of each sound source of the number of sound sources based, at least in part, on the selected model. The estimating the number of sound sources and estimating the DoA of each sound source are performed using a Bayesian framework, as described herein.

As used herein, "generalized model" corresponds to a set of models, $H_1, H_2, \ldots, H_M$ or a model with at least one parameter that has not been specified. As used herein, "specific parametric model" corresponds to the specific model selected by model selection operations, from the generalized model. The specific parametric model may thus correspond to one instance of the generalized model, e.g., $H_S$ or to the generalized model with the at least one parameter specified.

FIG. 1 illustrates a functional block diagram of a sound source enumeration and direction of arrival (DoA) system 100 consistent with several embodiments of the present disclosure. System 100 includes a computing device 102 and a microphone array 104. Microphone array 104 is configured to capture an acoustic signal 106. In general, the acoustic signal 106 may include contributions from a plurality of acoustic sources. Computing device 102 may include, but is not limited to, a microcomputer, a portable computer, a desktop computer, a tablet computer, a laptop computer, etc. Computing device 102 includes a processor circuitry 110, a memory circuitry 112, an input/output (I/O) circuitry 114 and a user interface (UI) 116. Computing device 102 may include an enumeration module 120, a DoA module 122, a model data store 124, a configuration data store 126 and/or a sound data store 128.

Processor circuitry 110 may include, but is not limited to, a single core processing unit, a multicore processor, a graphics processing unit, etc. Processor circuitry 110 is configured to perform operations of computing device 102, including, for example, operations of the enumeration module 120 and the DoA module 122. Memory circuitry 112 may be configured to store data and/or configuration parameters associated with enumeration module 120, DoA module 122 and/or microphone array 104. For example, memory circuitry 112 may be configured to store the model data store 124, the configuration data store 126 and/or the sound data store 128. I/O circuitry 114 may be configured to receive electrical signals from microphone array 104, as described herein. UI 116 may include a user input device (e.g., keyboard, mouse, touch sensitive display, etc.) and/or a user output device, e.g., a display. Model data store 124 may be configured to store parameters associated with each model, as described herein. Configuration data store 126 may be configured to store model data associated with one or more microphone array architectures. Configuration data 126 may include, for example, a microphone array architecture identifier, a number of microphones in the array, etc.

Microphone array 104 includes a plurality of microphones 130-1, . . . , 130-N. The plurality of microphones may be arranged in a particular configuration. Characteristics of the physical configuration may include, for example, a number of microphones and a respective position of each microphone relative to one or more other microphones in the array. Microphone array physical configurations may include, but are not limited to, one dimensional linear microphone arrays, two dimensional (e.g., rectangular) microphone arrays, coprime microphone arrays, spherical microphone arrays, etc. A spherical microphone array may be configured as a full sphere or may be configured as a portion (e.g., a hemisphere) of a sphere.

In operation, a sound signal may be captured by microphone array 104. The sound signal may include contributions from a plurality of sound sources. A number of sound sources and a location of each sound source may generally not be known. A corresponding electrical signal 106 may be received by computing device 102, by, e.g., I/O circuitry 114. The corresponding electrical signal 106 may be configured such that a respective individual electrical signal from each microphone 130-1, . . . , 130-N is maintained separate from each other individual electrical signal. The received electrical signals may be sampled and stored as one or more sound data sets in sound data store 128. Each sound data set may be associated with a microphone identifier and/or a time indicator. The sound data sets may thus correspond to data, D, as described herein.

Enumeration module 120 may be configured to perform sound source enumeration (i.e., model selection) operations within the Bayesian framework, as described herein. Sound source enumeration result may then be stored in model data store 124 and/or may be provided to a user via UI 116. DoA module 122 may be configured to estimate direction of arrival, e.g., an angle, for each sound source estimated by enumeration module 120 within the Bayesian framework, as described herein. DoA result may then be stored in model data store 124 and/or may be provided to a user via UI 116.

In an embodiment, the microphone array 104 is configured as a coprime microphone array architecture. A coprime microphone array may be one dimensional (i.e., linear) or two dimensional. A coprime linear microphone array allows for a relatively narrower beam with fewer microphones compared to a uniform linear microphone array. A coprime microphone array includes two uniform linear subarrays that are coincident (the same starting point and both continue in the same direction) with M and N microphones, respectively, where M and N are coprime with each other. By applying spatial filtering to both subarrays and combining their outputs, M+N−1 microphones are configured to yield M×N directional bands. Coprime linear microphone arrays may be configured to extend a frequency range of a given number of array elements by exceeding a spatial Nyquist limit.

In some embodiments, a coprime microphone array may be configured for broadband beamforming. Parametric models describing this broadband behavior enable the use of model-based Bayesian inference for estimating source directions as well as a number of sources present in the sound field. For example, for broadband beamforming coprime microphone array data, a generalized model may correspond to a generalized Laplace distribution function. The generalized Laplace distribution function may be written as:

$$H_S(\Theta_S, \theta) = A_0 + \sum_{s=1}^{S} A_s e^{-|\phi_s - \theta|/\delta_s} \tag{10}$$

where $\theta$ is azimuth angular variable, $A_0$ is a constant parameter configured to account for a noise floor and parameters per sound source include an amplitude, $A_s$, an angle of arrival, $\phi_s$, and beam width, $\delta_s$ of each sound source. The number of parameters per sound source in this example is three. The model parameter for S number of sound sources, $\Theta_S = \{A_1, A_2, \ldots, A_S, \phi_S, \delta_1, \ldots, \delta_S\}$, includes all the amplitude and angular parameters.

Model selection is related to the probability to which a modeled set of data matches an experimentally measured set of data. In this example, the experimentally measured data may correspond to a set of sound signal intensities measured at a plurality of angles, $D=[D(\theta)]$. Model selection (corresponding to enumerating a number of sound sources) includes estimating (i.e., determining) the posterior probability, $p(H_s|D)$, as described herein.

Considering the principle of maximum entropy where no assumptions are made beyond available known information. For the likelihood function, the variance between observed data and model predicted data is assumed finite. Accordingly, the likelihood function corresponds to a normal distribution:

$$p(D|\Theta, H_s, \sigma) = \left(\frac{1}{\sigma\sqrt{2\pi}}\right)^K e^{-E^2/\sigma^2} \tag{11}$$

where $E^2 = \sum_{k=1}^{K} (D_k - H_{s,k})^2/2$, and K is the number of data points. The standard deviation term is not of interest, thus dependence on this parameter may be removed by integrating the joint probability density distribution of the likelihood over all possible values of $\sigma$. Thus, the marginalized probability distribution function for the likelihood takes the form of a student t-distribution as:

$$p(D|\Theta, H_s) = 2\pi^{-K/2} \Gamma\left(\frac{K}{2}\right) \frac{E^{-K}}{2} \tag{12}$$

where $\Gamma(K/2)$ is the gamma function evaluated at K/2 (K being the number of data points). Based on the maximum entropy, the prior is assumed to be constant. The marginal likelihood, $p(D|H_s)$, is determined numerically, as described herein. The evidence may then be determined, i.e., the integral for evidence, may be approximated, using a Markov chain Monte Carlo method, e.g., nested sampling.

Thus, given the generalized model of Eq. 10 and experimentally measured data captured from microphone array 104 by, e.g., I/O circuitry 114 and/or enumeration module 120, Bayesian analysis, as described herein, may be performed to estimate the number of sound sources indicated by the experimentally measured data. Estimating the number of sound sources corresponds to selecting a specific parametric model from the generalized model. In this example, the generalized model corresponds to S models of Eq. 10.

In another embodiment, the microphone array 104 is configured as a spherical microphone array architecture. In this embodiment, the spherical microphone array may correspond to a full sphere or to a hemisphere. A spherical microphone array includes a plurality of microphones distributed over a surface of at least a portion of a sphere, for example, a hemisphere.

A spherical microphone array may be configured to facilitate spherical harmonic beamforming. Spherical harmonic beamforming corresponds to processing a sound signal to map sound energy around the spherical array. Principles of spherical harmonics may be utilized to beamform spherical sound signals in order to map and model a sound energy of a sound scape. Spherical harmonics can be formulated by solving the spherical wave equation. Spherical harmonics may be represented as:

$$Y_n^m(\theta, \phi) \equiv \sqrt{\frac{(2n+1)}{4\pi} \frac{(n-m)!}{(n+m)!}} P_n^m(\cos\theta) e^{jm\phi} \tag{13}$$

where $\theta, \phi$ are elevation and azimuth angles, m, n are integer numbers representing a degree and an order of spherical harmonics, respectively. $P_n^m(\cdot)$ is the Legendre function of degree m and order n, and $j=\sqrt{-1}$. The degree m may be understood as representing different orientations of the spherical harmonics and the order n, provides an increase in resolution. The number of microphones sampling the sphere determines the order of spherical harmonics that the spherical array may achieve.

"Beamforming" relates to spatially filtering a signal, e.g., a sound signal. "Spherical beamforming" corresponds to spatially filtering data with respect to a sphere. Spatial filtering may facilitate "listening" to a selected direction and suppressing other directions. A spatial filter direction may thus be referred to as a beam and a directional pattern of this "listening" direction may be described as a beam pattern. For filtering a plurality of sound sources, an energy sum of a plurality of filter directions may be written as:

$$H_S(\Psi_s, \theta, \phi) = \sum_{s=1}^{S} A_s \frac{|g(\Psi_s, \theta, \phi)|^2}{\max[|g(\Psi_s, \theta, \phi)|^2]} \tag{14}$$

where S is the number of concurrent sound sources, $A_s$ represents amplitude and the fraction represents normalized energy associated with the sth source, with $$g(\Psi_s, \theta, \phi) = 2\pi \sum_{n=1}^{N} \sum_{m=-n}^{n} [Y_n^m(\Psi_s)]^* Y_n^m(\theta, \phi) \tag{15}$$

where $\Psi_s=\{\theta_1,\ldots,\theta_S;\phi_1,\ldots,\phi_S\}$ are S number of listening directions (sound sources), which are fixed, yet unknown, and $\Psi_s=\{\theta_S,\phi_S\}$ denotes the direction of the sth sound source. The symbol * represents complex conjugate. $Y_n^m(\cdot)$ are the spherical harmonics of order n and degree m.

In cases where beamforming is used, beamforming data D $(\theta_i, \phi_i)$ captured from M number of microphones embedded on a rigid spherical surface with radius, r, may be expressed as:

$$D(\theta, \phi) = \frac{|y(\theta, \phi)|^2}{\max[|y(\theta, \phi)|^2]} \text{ where:} \quad (16)$$

$$y(\theta, \phi) = \frac{4\pi}{M} \sum_{n=0}^{N} \sum_{m=-n}^{n} \left\{ \begin{array}{c} w_{n,m}^*(k, r, \theta, \phi) \times \\ \left(\sum_{i=1}^{M} p_{mic}(k, r, \theta_i, \phi_i)[Y_n^m(\theta_i, \phi_i)]^*\right) \end{array} \right\} \quad (17)$$

where $p_{mic}(k,r,\theta_i,\phi_i)$ represents the ith microphone output among M microphone channels around a rigid sphere surface at angular position $\{\theta_i,\phi_i\}$, and $$w_{n,m}^*(k, r, \theta, \phi) = \frac{Y_n^m(\theta, \phi)}{4\pi j^n} \left[ j_n(k\ r) - \frac{j_n'(k r)}{h_n'(k r)} h_n(k\ r) \right]^{-1} \quad (18)$$

for axis-symmetric beamforming in the plane-wave decomposition mode, and the bracket represents spherical mode amplitude for a rigid sphere with $j_n(k\ r)$ and $h_n(k\ r)$ being spherical Bessel and Hankel functions of the first kind, respectively. The prime denotes the derivative with respect to the argument. Angular variables, $\theta$, and $\phi$, represent the elevation and the azimuth angles, respectively.

Enumerating a number of sound sources (corresponding to model selection) is related to the probability to which a modeled set of data, $H_i=[H_i(\Psi_i,\theta,\phi)]$, matches an experimentally measured set of data, $D=[D(\theta,\phi)]$, as given in Eq. 16. In other words, enumerating the number of sound sources corresponds to determining $p(H_j|D)$, the posterior probability, as described herein. Thus, given the generalized model of Eq. 14 and experimentally measured data captured from microphone array 104 by, e.g., I/O circuitry 114 and/or enumeration module 120, Bayesian analysis, as described herein, may be performed to estimate the number of sound sources indicated by the experimentally measured data. Estimating the number of sound sources corresponds to selecting a specific parametric model from the generalized model. In this example, the generalized model corresponds to S models of Eq. 14.

Parameter estimation may be performed based, at least in part, on Bayes' Theorem (Eq. 7), as described herein. The evidence, $p(D|H)$ may be determined according to Eq. 8, by integrating the product of the likelihood and the prior distribution. The likelihood, $p(D|\theta,H)$, may be determined as:

$$p(D|\theta, H) \propto \Gamma\left(\frac{Q}{2}\right) \frac{(2\pi E)^{-Q/2}}{2} \text{ with} \quad (19)$$

$$E = \frac{1}{2} \sum_{j=1}^{J} \sum_{k=1}^{K} [D(\theta_j, \phi_k) - H(\theta_j, \phi_k)]^2$$

where Q is the total number of data points, $Q=J\cdot K$ with $\theta_1 \leq \theta_j \leq \theta_J$ and $\phi_1 \leq \phi_k \leq \phi_K$ covering the entire angular range under consideration. Model $H(\theta_j,\phi_k)$ and data $D(\theta_j,\phi_k)$ are determined by Eqs. 14 and 16, respectively.

The Bayesian framework applied to prediction of DoA for a plurality of sound sources includes determination of the evidence term. The evidence may be determined based, at least in part, on sampling. In one nonlimiting example, nested sampling may be used. The model parameters associated with a sample model associated with a maximum likelihood or with model parameters that have converged to within a tolerance may then correspond to direction of arrival, i.e., angles $\theta$ and $\phi$.

Thus, the sound source enumeration and direction of arrival system 100 may be configured to estimate a number of sound sources and direction of arrival of an acoustic signal, within a probabilistic Bayesian framework.

Figure 2:
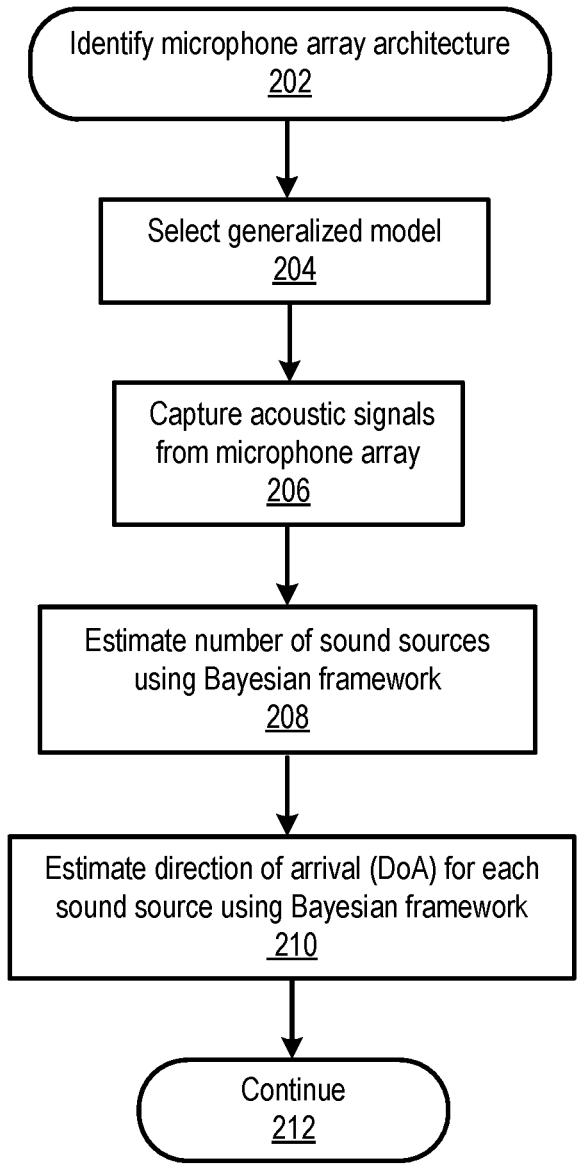
FIG. 2 is a flowchart of sound source enumeration and direction of arrival estimation operations consistent with several embodiments of the present disclosure.

FIG. 2 is a flowchart 200 of example sound source enumeration and DoA estimation operations consistent with several embodiments of the present disclosure. In particular, the flowchart 200 illustrates estimating a number of sound sources and a direction of arrival of each sound source using a Bayesian framework. The operations of flowchart 200 may be performed by, for example, computing device 102 (e.g., enumeration module 120 and/or DoA module 122) of FIG. 1.

Operations of flowchart 200 may begin with identifying a microphone array architecture at operation 202. A generalized models may be selected at operation 204. For example, the generalized model may be selected based, at least in part, on the identified microphone array architecture. An acoustic signal may be captured from the microphone array at operation 206. At operation 208, a number of sound sources may be estimated using a Bayesian framework. Estimating the number of sound sources may correspond to selecting a specific parametric model from the generalized model. At operation 210, a direction of arrival for each sound source be estimated using a Bayesian framework. Program flow may then continue at operation 212.

Thus, a number of sound sources may be estimated and a direction of arrival of each sound source may be estimated using a Bayesian framework.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hard-wired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory circuitry 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively memory circuitry 112 may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method of sound source enumeration and direction of arrival (DoA) estimation, the method comprising:
    capturing an acoustic signal by a microphone array;
    transmitting electrical signals from the microphone array to input/output circuitry of a computing device;
    processing the electrical signals via processor circuitry of the computing device, the processing including:
        estimating, by an enumeration module, a number of sound sources associated with the acoustic signal, the estimating comprising selecting a specific parametric model from a generalized model, the generalized model related to a microphone array architecture used to capture the acoustic signal; and
        estimating, by a DoA module, a direction of arrival of each sound source of the number of sound sources based, at least in part, on the selected model,
    wherein the estimating the number of sound sources and estimating the DoA of each sound source are performed using a Bayesian framework.

2. The method of claim 1, wherein the microphone array is configured to implement beamforming.

3. The method of claim 1, wherein estimating the DoA comprises estimating at least one parameter of the selected model.

4. The method of claim 1, wherein estimating the number of sound sources comprises comparing an evidence associated with a first parametric model with an evidence associated with a second parametric model.

5. The method according to claim 1, wherein the microphone array architecture corresponds to a coprime microphone array.

6. The method according to claim 1, wherein the microphone array architecture corresponds to a spherical microphone array.

7. The method according to claim 1, wherein estimating the number of sound sources comprises nested sampling.

8. A non-transitory computer readable storage device having stored thereon instructions for processing electrical signals corresponding to an acoustic signal, the electrical signals transmitted from a microphone array to input/output circuitry of a computing device, the computer readable storage device comprising:
    an enumeration module configured with instructions for estimating a number of sound sources associated with the acoustic signal, the estimating comprising selecting a specific parametric model from a generalized model, the generalized model related to a microphone array architecture used to capture the acoustic signal; and
    a direction of arrival (DoA) module configured with instructions for estimating a direction of arrival of each sound source of the number of sound sources based, at least in part, on the selected model,
    wherein the computing device includes processor circuitry for performing the instructions of the computer readable storage device for estimating the number of sound sources and estimating the DoA of each sound source, and
    wherein the instructions are based on a Bayesian framework.

9. The device of claim 8, wherein the microphone array is configured to implement beamforming.

10. The device of claim 8, wherein estimating the DoA comprises estimating at least one parameter of the selected model.

11. The device of claim 8, wherein estimating the number of sound sources comprises comparing an evidence associated with a first parametric model with an evidence associated with a second parametric model.

12. The device according to claim 8, wherein the microphone array architecture corresponds to a coprime microphone array.

13. The device according to claim 8, wherein the microphone array architecture corresponds to a spherical microphone array.

14. The device according to claim 8, wherein estimating the number of sound sources comprises nested sampling.

15. A system for sound source enumeration and direction of arrival (DoA) estimation, the system comprising:
    a microphone array configured to capture an acoustic signal;
    a computing device comprising:
        an enumeration module configured with instructions to estimate a number of sound sources associated with the acoustic signal, the estimating comprising selecting a specific parametric model from a generalized model, the generalized model related to a microphone array architecture used to capture the acoustic signal; and
        a DoA module configured with instructions to estimate a direction of arrival of each sound source of the number of sound sources based, at least in part, on the selected model,
            wherein the estimating the number of sound sources and estimating the DoA of each sound source are performed using a Bayesian framework;

memory circuitry configured to store data and/or configuration parameters associated with the enumeration module, the DoA module, and the microphone array;

input/output circuitry configured to receive electrical signals from the microphone array;

processor circuitry configured to perform operations of the enumeration module and the DoA module.

16. The system of claim 15, wherein the microphone array is configured to implement beamforming.

17. The system of claim 15, wherein estimating the DoA comprises estimating at least one parameter of the selected model.

18. The system of claim 15, wherein estimating the number of sound sources comprises comparing an evidence associated with a first parametric model with an evidence associated with a second parametric model.

19. The system of claim 16, wherein the microphone array architecture corresponds to a coprime microphone array.

20. The system of claim 16, wherein the microphone array architecture corresponds to a spherical microphone array.

* * * * *